W. F. Pough,
Ice Plane.
N° 92,542.                    Patented July 13, 1869.
Fig: 1
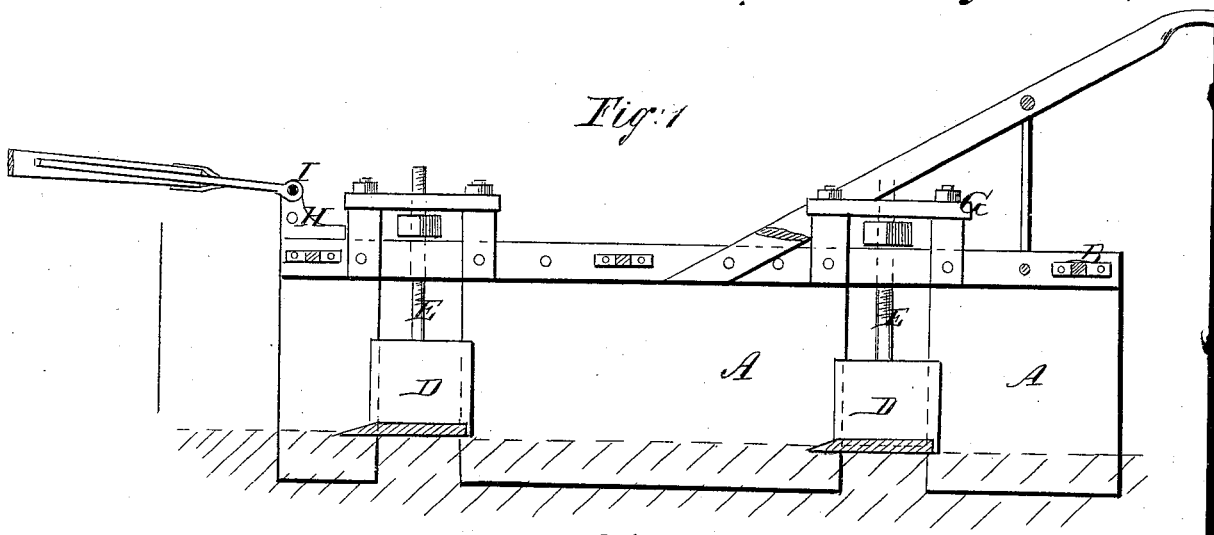
Fig: 2
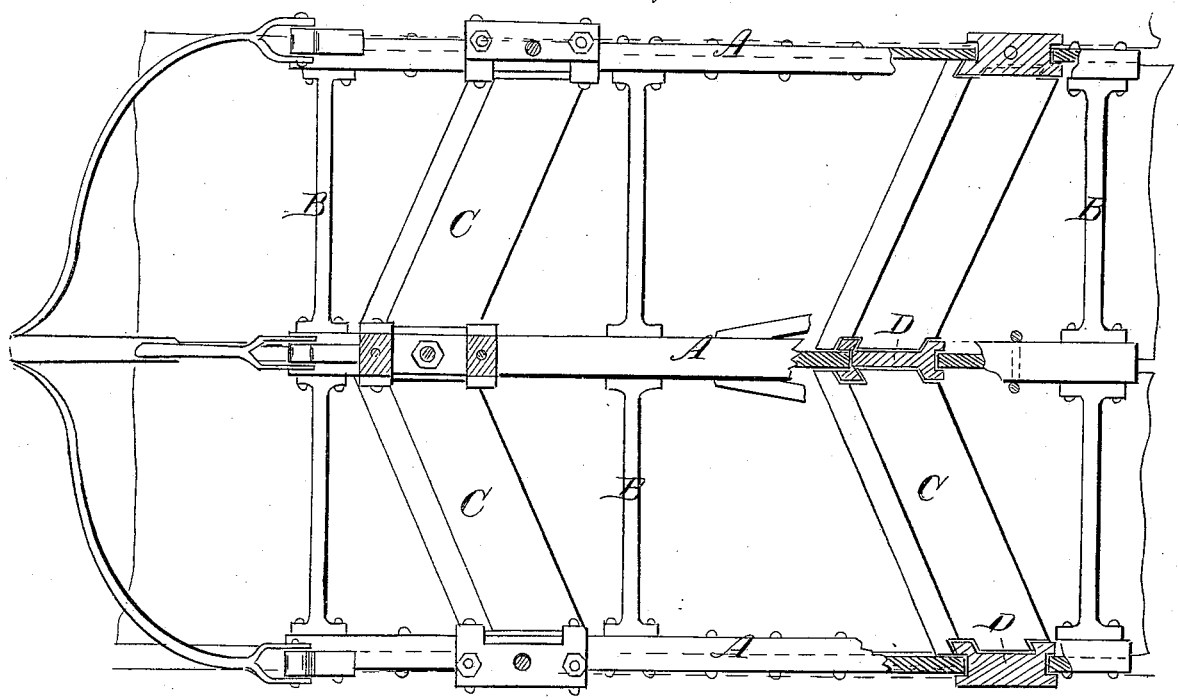
Witnesses:
C. Raettig.
Wm A Morgan
Inventor:
W. F. Pough
pr
Attorneys

United States Patent Office.

WILLIAM F. POUGH, OF ESOPUS, NEW YORK.

Letters Patent No. 92,542, dated July 13, 1869.

IMPROVEMENT IN ICE-PLANER.

The Schedule referred to in these Letters Patent and making part of the same.

*To all whom it may concern:*

Be it known that I, WILLIAM F. POUGH, of Esopus, in the county of Ulster, and State of New York, have invented a new and useful Improvement in Ice-Planes; and I do hereby declare that the following is a full, clear, and exact description thereof, which will enable others skilled in the art to make and use the same, reference being had to the accompanying drawings, forming part of this specification.

This invention relates to improvements in ice-planes, and consists in an improved arrangement of knives, whereby the cutting is made easier;

Also an improved method of securing the cutters to the framing or runners; and

Also an improved arrangement of means for adjusting the knives to vary the depth of cutting.

Figure 1 represents a longitudinal sectional elevation of my improved machine, and Figure 2 represents a plan view, with parts broken away.

Similar letters of reference indicate corresponding parts.

I propose to construct a framing, having two or more runners, A, connected together by the cross-trees B.

The said runners are designed to run in grooves previously made in the ice, and to support the planes or cutters C, which are arranged in sets of two or more, one behind the other, the hinder cutters being lower than those in advance, so as to divide the amount required to be planed off between the cutters of each set, whereby the work may be accomplished more easily than when the whole is effected by one cutter.

The said planes or cutters are supported at each end in sliding blocks D, arranged in the vertical spaces in the runners, and provided with adjusting-screws E, the nuts F of which are confined between the upper edge of the runners and the caps G.

I propose, as a further means of reducing the resistance of the ice to the edges of the cutters, instead of arranging them at right angles to the line of advancement, as is now commonly done, to place them at any preferred angle less than a right angle, as represented in fig. 2, whereby the angle of the cutting-edge, when taken in the line of advancement, will be more acute, and will consequently enter the ice more easily.

I propose to mortise and tenon the ends of the cutters to the blocks D, in the manner represented in the broken view in fig. 1, the tenons being so formed as to wedge in tightly, and dispense with bolts, screws, &c.

The transverse ties B prevent the cutters from withdrawing from the sliding blocks.

To vary the draught of the shafts, the lugs H may be provided with holes for the connecting-bolt I, or other means arranged to adjust the connection higher or lower on the framing.

Having thus described my invention,

I claim as new, and desire to secure by Letters Patent—

1. The combination, with the framing A, of the cutters C, when arranged in sets of two or more, and otherwise, substantially as specified.

2. The arrangement of the cutters C, slides D, and adjusting-screws E, substantially as and for the purpose specified.

3. The cutters, connected to the sliding blocks D, as described, and maintained in the said connection by the cross-bars B, uniting the runners, substantially as specified.

The above specification of my invention signed by me, this 9th day of December, 1868.

WILLIAM F. POUGH.

Witnesses:
 FRANK BLOCKLEY,
 ALEX. F. ROBERTS.